United States Patent
Murakami et al.

(10) Patent No.: US 10,061,927 B2
(45) Date of Patent: Aug. 28, 2018

(54) STORAGE MEDIUM HAVING STORED THEREIN BOOT PROGRAM, INFORMATION PROCESSING APPARATUS, INFORMATION PROCESSING SYSTEM, INFORMATION PROCESSING METHOD, SEMICONDUCTOR APPARATUS, AND STORAGE MEDIUM HAVING STORED THEREIN PROGRAM

(71) Applicant: NINTENDO CO., LTD., Kyoto (JP)

(72) Inventors: Yutaka Murakami, Kyoto (JP); Minoru Hatamoto, Kyoto (JP); Tatsuhiro Shirai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 220 days.

(21) Appl. No.: 14/874,799

(22) Filed: Oct. 5, 2015

(65) Prior Publication Data
US 2016/0103994 A1 Apr. 14, 2016

(30) Foreign Application Priority Data
Oct. 8, 2014 (JP) ................................. 2014-206917

(51) Int. Cl.
*G06F 21/57* (2013.01)

(52) U.S. Cl.
CPC .... *G06F 21/572* (2013.01); *G06F 2221/2109* (2013.01)

(58) Field of Classification Search
CPC .................................. G06F 21/57; G06F 21/50
See application file for complete search history.

(56) References Cited

U.S. PATENT DOCUMENTS

| | | | |
|---|---|---|---|
| 8,543,839 B2 | 9/2013 | Sibert | |
| 2005/0216753 A1* | 9/2005 | Dailey | G06F 21/572 713/191 |
| 2006/0100749 A1 | 5/2006 | Feilen et al. | |
| 2011/0087872 A1 | 4/2011 | Shah et al. | |
| 2011/0197185 A1* | 8/2011 | Hobbet | G06F 8/65 717/168 |
| 2011/0213986 A1 | 9/2011 | Kanee et al. | |
| 2012/0281839 A1 | 11/2012 | Arnold et al. | |
| 2014/0068594 A1* | 3/2014 | Young | G06F 21/572 717/172 |
| 2014/0136856 A1* | 5/2014 | Flynn | G06F 9/4406 713/193 |

FOREIGN PATENT DOCUMENTS

JP 2012-185767 9/2012

OTHER PUBLICATIONS

European Search Report dated Feb. 8, 2016, issued in corresponding European Application No. 15187864.2 (9 pages).

* cited by examiner

*Primary Examiner* — Izunna Okeke
(74) *Attorney, Agent, or Firm* — Nixon & Vanderhye PC

(57) ABSTRACT

Identification information of a program read from outside, such as firmware, is acquired, and usability of a piece of key data in a range corresponding to the identification information is set, among a plurality of pieces of key data to be used for the program. As another example, based on new key data generated based on key data stored in advance in a memory and identification information, firmware corresponding to the identification information is decrypted.

29 Claims, 5 Drawing Sheets

STORAGE MEDIUM HAVING STORED THEREIN BOOT PROGRAM, INFORMATION PROCESSING APPARATUS, INFORMATION PROCESSING SYSTEM, INFORMATION PROCESSING METHOD, SEMICONDUCTOR APPARATUS, AND STORAGE MEDIUM HAVING STORED THEREIN PROGRAM

CROSS REFERENCE TO RELATED APPLICATION

The disclosure of Japanese Patent Application No. 2014-206917, filed on Oct. 8, 2014, is incorporated herein by reference.

FIELD

The technology shown here relates to a storage medium having stored therein a boot program, an information processing apparatus, an information processing system, an information processing method, a semiconductor device, and storage medium having stored therein a program, and in particular, relates to a storage medium having stored therein a boot program, an information processing apparatus, an information processing system, an information processing method, a semiconductor device, and a storage medium having stored therein a program that are capable of, for example, starting a program to be read first, such as firmware.

BACKGROUND AND SUMMARY

Conventionally, there is a technique of, in an electronic device for operating by starting firmware, updating the firmware to have a new function.

If, however, the confidentiality of firmware is lost, even the confidentiality of updated firmware may be similarly lost. Thus, there is a need for further improvement of security.

Therefore, it is an object of an exemplary embodiment to provide a boot program, an information processing apparatus, an information processing system, an information processing program, an information processing method, a semiconductor device, and a program that are capable of improving the confidentiality of a program read from outside, such as firmware.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein a boot program according to the exemplary embodiment, a boot program is executed by a computer of an information processing apparatus before firmware is started. The boot program causes the computer to execute: acquiring identification information of the firmware; and setting usability of a piece of key data in a range corresponding to the identification information, among a plurality of pieces of key data to be used for the firmware.

Based on the above, a boot program to be executed before firmware is started makes a plurality of pieces of key data usable in a range corresponding to identification information of the firmware. Thus, it is possible to ensure the confidentiality of the firmware in accordance with the identification information.

In addition, the boot program may further cause the computer to execute reading the firmware. In this case, in the acquisition of the identification information, the identification information of the read firmware may be acquired.

Based on the above, it is possible to manage the confidentiality of key data using the read firmware.

In addition, in the acquisition of the identification information, identification information of firmware started before a current moment may be acquired.

Based on the above, in accordance with identification information of firmware started before the current moment, it is possible to manage the confidentiality of key data.

In addition, the identification information may be a version set for the firmware.

Based on the above, it is possible to manage the confidentiality of key data using the version of the firmware.

In addition, the plurality of pieces of key data may be different with respect to each version. In the setting of the usability of the piece of key data, among the plurality of pieces of key data, a piece of key data corresponding to a version newer than the acquired version may be set to be unusable.

Based on the above, it is possible to ensure the confidentiality of key data corresponding to the version of new firmware.

In addition, in the setting of the usability of the piece of key data, after the firmware is started, the setting of the piece of key data may not be able to be changed at least from unusable to usable.

Based on the above, after the firmware is started, the setting of key data cannot be changed from unusable to usable. Thus, it is possible to further improve the confidentiality of the key data.

In addition, in the setting of the usability of the piece of key data, among the plurality of pieces of key data, a piece of key data corresponding to the version acquired in the acquisition of the identification information may be set to be usable, and at least one of pieces of key data corresponding to a version older than the acquired version may be set to be usable.

Based on the above, key data to be used to decrypt a program corresponding to an old version can be set to be usable. Thus, it is possible to perform processing such as the decryption of the program.

In addition, in the acquisition of the identification information, identification information described in a header of the firmware read in the reading of the firmware may be acquired as the acquired identification information of the firmware. In the setting of the usability of the piece of key data, the usability of the piece of key data may be set in accordance with the identification information described in the header.

Based on the above, it is possible to manage the confidentiality of the key data using header information of the firmware.

In addition, the boot program may further cause the computer to execute, before the usability of the piece of key data is set in the setting of the usability of the piece of key data, decrypting the firmware corresponding to the acquired identification information, using any of the plurality of pieces of key data.

Based on the above, the firmware is decrypted using the key data of which the confidentiality is ensured. Thus, it is also possible to improve the confidentiality of the firmware.

In an exemplary configuration of an information processing apparatus according to the exemplary embodiment, an information processing apparatus includes: a key data storage memory configured to store a plurality of pieces of key data to be used for firmware; and a computer processor configured to: execute a boot program; acquire identification information of the firmware in accordance with the execution of the boot program; set usability of a piece of key data in a range corresponding to the identification information, among the plurality of pieces of key data; and after the usability of the piece of key data is set, start the firmware corresponding to the acquired identification information.

Based on the above, a boot program to be executed before firmware is started makes a plurality of pieces of key data usable in a range corresponding to identification information of the firmware. Thus, it is possible to ensure the confidentiality of the firmware in accordance with the identification information.

In addition, the computer processor may be further configured to store the identification information of the started firmware in a non-volatile memory. In this case, the identification information stored in the non-volatile memory may be acquired as the identification information of the firmware. The usability of the piece of key data may be set in accordance with the identification information stored in the non-volatile memory.

Based on the above, in accordance with identification information of firmware started before the current moment, it is possible to manage the confidentiality of key data.

In addition, if the identification information stored in the non-volatile memory is updated, the usability of the piece of key data may be reset after the update.

Based on the above, based on identification information updated in a non-volatile memory, it is possible to immediately start the firmware.

In addition, the computer processor may be further configured to, after the firmware is started, encrypt or decrypt input data using the piece of key data set to be usable.

Based on the above, input data other than the firmware is also encrypted or decrypted using the key data of which the confidentiality is ensured. Thus, it is also possible to improve the confidentiality of the input data.

In addition, the computer processor may be further configured to, after the firmware is started, decrypt another program using the piece of key data set to be usable.

Based on the above, a program other than the firmware is also decrypted using the key data of which the confidentiality is ensured. Thus, it is also possible to improve the confidentiality of the program.

In addition, the exemplary embodiment may be carried out in the forms of an information processing system including the above means and an information processing method including the operations performed by the above means.

In addition, in an exemplary configuration of a semiconductor device according to the exemplary embodiment, a semiconductor device includes a processor, a first memory, and a second memory. The first memory stores a boot program. The second memory stores a plurality of pieces of key data. In accordance with execution of the boot program stored in the first memory, the processor is configured to: acquire identification information of firmware; if a plurality of pieces of key data are stored in the second memory, set usability of a piece of key data in a range corresponding to the identification information, among the pieces of key data; and after the usability of the piece of key data is set, start the firmware corresponding to the acquired identification information.

Based on the above, a boot program to be executed before firmware is started makes a plurality of pieces of key data usable in a range corresponding to identification information of the firmware. Thus, it is possible to ensure the confidentiality of the firmware in accordance with the identification information.

In addition, in another exemplary configuration of an information processing apparatus according to the exemplary embodiment, an information processing apparatus, including a memory configured to store an internal program, for executing an external program subsequently to execution of the internal program, includes: a key data storage memory configured to store a plurality of pieces of key data; and a computer processor configured to: acquire the external program from outside the information processing apparatus; acquire identification information of the external program; set usability of a piece of key data in a range corresponding to the identification information, among the pieces of key data stored in the key data storage memory; and after the usability of the piece of key data is set, start the acquired external program.

Based on the above, an internal program to be executed before an external program is started makes a plurality of pieces of key data usable in a range corresponding to identification information of the external program read from outside an information processing apparatus. Thus, it is possible to ensure the confidentiality of the external program in accordance with the identification information.

In addition, in an exemplary configuration of a non-transitory computer-readable storage medium having stored therein a program according to the exemplary embodiment, a program cannot be updated and is executed by a computer of an information processing apparatus before a program that can be updated is started. The program causes the computer to execute: acquiring version information of the program that can be updated; and based on the acquired version information, setting usability of a piece of key data in a range corresponding to the version information, among a plurality of pieces of key data to be used for the program that can be updated.

Based on the above, execution of a program that cannot be updated makes a plurality of pieces of key data usable in a range corresponding to version information of a program that can be updated. Thus, it is possible to ensure the confidentiality of the program that can be updated, in accordance with the version information.

In another exemplary configuration of a storage medium having stored therein a boot program according to the exemplary embodiment, a boot program is executed by a computer of an information processing apparatus before firmware is started. The boot program causes the computer to execute: acquiring identification information of the firmware; based on key data stored in advance in a memory and the identification information, generating new key data; based on the generated key data, decrypting the firmware corresponding to the identification information; disabling generation of key data in the generation of the key data; and starting the decrypted firmware.

Based on the above, a boot program to be executed before firmware is started generates key data for decrypting the firmware in accordance with identification information of the firmware and decrypts the firmware. Further, the function of generating the key data is disabled. Thus, it is possible to improve the confidentiality of the firmware.

In the starting of the firmware, the decrypted firmware may be started after generation of key data is disabled in the disabling of generation of key data.

Based on the above, after the function of generating key data for decrypting the firmware is disabled, the firmware is decrypted. Thus, it is possible to ensure the confidentiality of the key data.

In the disabling of generation of key data, a key generation function in the generation of the key data may be set to be usable only once, thereby disabling generation of key data in the generation of the key data.

Based on the above, the function of generating key data for decrypting the firmware is set to be usable only once, whereby it is possible to ensure the confidentiality of the key data.

In the disabling of generation of key data, after the firmware is decrypted, the key data stored in the memory may be set to be unusable, thereby disabling generation of new key data using the key data.

Based on the above, the key data stored in a memory after the firmware is decrypted is set to be unusable, whereby it is possible to disable the generation of new key data with the confidentiality ensured.

In the disabling of generation of key data, after the firmware is decrypted, access to a unit configured to achieve the generation of the key data may be set to be impossible, thereby disabling generation of key data in the generation of the key data.

Based on the above, access to the function of generating key data is set to be impossible, whereby it is possible to disable the generation of new key data with the confidentiality ensured.

The memory may store a single piece of key data for generating the key data. In this case, in the generation of the key data, based on the single piece of key data stored in the memory and the identification information, new key data may be generated.

Based on the above, it is possible to decrypt a plurality of pieces of firmware different in identification information, using a single piece of key data.

The boot program may further cause the computer to execute disabling the new key data generated in the generation of the key data.

Based on the above, newly generated key data is disabled, whereby it is possible to ensure the confidentiality of the key data.

The boot program may further cause the computer to execute reading the firmware. In this case, in the acquisition of the identification information, the identification information of the read firmware may be acquired.

Based on the above, it is possible to generate key data corresponding to the read firmware.

In the acquisition of the identification information, identification information of firmware started before a current moment may be acquired.

Based on the above, it is possible to generate key data corresponding to identification information of firmware started before the current moment.

The identification information may be a version set for the firmware.

Based on the above, it is possible to generate key data corresponding to the version of the firmware.

In the acquisition of the identification information, identification information described in a header of the firmware read in the reading of the firmware may be acquired as the acquired identification information of the firmware. In the generation of the key data, based on the key data stored in advance in the memory and the identification information described in the header, new key data may be generated.

Based on the above, it is possible to generate key data corresponding to the firmware, using header information of the firmware.

In addition, the exemplary embodiment may be carried out in the forms of an information processing apparatus and an information processing system including the above means and an information processing method including the operations performed by the above means.

In addition, in another exemplary configuration of a semiconductor device according to the exemplary embodiment, a semiconductor device includes a processor, a first memory, and a second memory. The first memory stores a boot program. The second memory stores key data. In accordance with execution of the boot program stored in the first memory, the processor is configured to: acquire identification information of firmware; based on the key data stored in the second memory and the identification information, generate new key data; based on the generated key data, decrypt the firmware corresponding to the identification information; disable generation of key data in the generation of the key data; and start the decrypted firmware.

Based on the above, a boot program to be executed before firmware is started generates key data for decrypting the firmware in accordance with identification information of the firmware and decrypts the firmware. Further, the function of generating the key data is disabled. Thus, it is possible to improve the confidentiality of firmware.

In addition, in another exemplary configuration of an information processing apparatus according to the exemplary embodiment, an information processing apparatus, including a memory configured to store an internal program, for executing an external program subsequently to execution of the internal program, includes: a key data storage memory configured to store key data to be used for the external program; and a computer processor configured to: execute the internal program; acquire the external program from outside the information processing apparatus; acquire identification information of the external program in accordance with the execution of the internal program; based on the key data stored in the key data storage memory and the identification information, generate new key data; based on the generated key data, decrypt the external program corresponding to the identification information; disable generation of key data in the generation of the key data; and start the decrypted external program.

Based on the above, an internal program to be executed before an external program is started generates key data for decrypting the external program in accordance with identification information of the external program and decrypts the external program. Further, the function of generating the key data is disabled. Thus, it is possible to improve the confidentiality of the external program.

In addition, in another exemplary configuration of a storage medium having stored therein a program according to the exemplary embodiment, a program cannot be updated and is executed by a computer of an information processing apparatus before a program that can be updated is started. The program that cannot be updated causes the computer to execute: acquiring version information of the program that can be updated; based on key data stored in advance in a memory and the acquired version information, generating new key data; based on the generated key data, decrypting the program that can be updated corresponding to the version information; disabling generation of key data in the generation of the key data; and starting the decrypted program that can be updated.

Based on the above, execution of a program that cannot be updated generates key data corresponding to version information of a program that can be updated. Thus, it is possible to generate key data corresponding to the version information, and the function of generating the key data is disabled. Thus, it is possible to improve the confidentiality of the program that can be updated.

According to the exemplary embodiment, a plurality of pieces of key data are made usable in a range corresponding to identification information of firmware or identification information of an external program read from outside. Thus, it is possible to ensure the confidentiality of key data in accordance with the identification information.

These and other objects, features, aspects and advantages of the exemplary embodiments will become more apparent from the following detailed description of the exemplary embodiments when taken in conjunction with the accompanying drawings.

Figure 1:
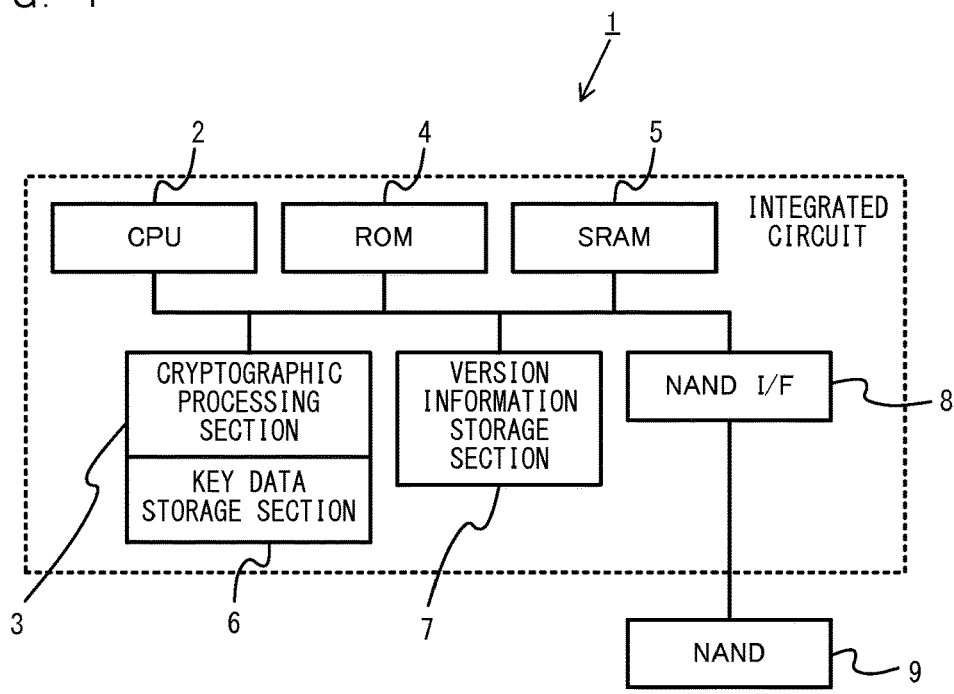
FIG. 1 is a block diagram showing a non-limiting example of an information processing apparatus according to a first exemplary embodiment, which includes an integrated circuit 1.

DETAILED DESCRIPTION OF NON-LIMITING EXAMPLE EMBODIMENTS (First Exemplary Embodiment)
With reference to FIG. 1, a description is given of an information processing apparatus according to a first exemplary embodiment. It should be noted that FIG. 1 is a block diagram showing an example of the information processing apparatus including an integrated circuit 1.

For example, the information processing apparatus includes an integrated circuit 1. Here, the information processing apparatus can execute a program stored in a storage medium such as an exchangeable memory card or an exchangeable optical disk, or received from a server or another apparatus. It should be noted that the information processing apparatus may include one or more apparatuses, and the integrated circuit 1 may be provided in a plurality of apparatuses in a dispersed manner.

In the information processing apparatus, a NAND 9 and the like are provided in addition to the integrated circuit 1. Further, the integrated circuit 1 includes a CPU 2, a cryptographic processing section 3, a ROM 4, an SRAM 5, a key data storage section 6, a version information storage section 7, a NAND I/F 8, and the like on a single semiconductor chip, using a SoC (System on a Chip), for example. Then, the CPU 2 transmits and receives data, a command, an address, and the like to and from the cryptographic processing section 3, the ROM 4, the SRAM 5, the version information storage section 7, and the NAND 9 (the NAND I/F 8).

The CPU 2 is an example of information processing means (a computer) for performing various types of information processing. The CPU 2 has the function of performing, as one of the various types of information processing, the process of initializing the key data storage section 6 and the version information storage section 7 using data (a boot program) set in the ROM (Read-Only Memory) 4, for example. Further, the CPU 2 has the function of performing, as one of the various types of information processing, the process of initializing the version information storage section 7 using data (firmware) set in the NAND (NAND flash memory) 9, for example. For example, the CPU 2 executes predetermined programs (a boot program, firmware, and the like), thereby achieving the above functions. Each of the ROM 4, the SRAM (Static Random Access Memory) 5, and the NAND 9 is a memory accessible by the CPU 2 and stores various types of data for use when the CPU 2 performs the above processes. It should be noted that a program to be executed by the CPU 2 may be stored in any storage device (storage medium) accessible by the CPU 2, and is stored in, for example, the ROM 4 or the NAND 9. The above program may be stored in another storage device provided in the information processing apparatus including the CPU 2, or may be stored in a storage medium detachably attached to the information processing apparatus including the CPU 2. Further, the above program may be stored in a storage device (a server or the like) connected to the CPU 2 via a network. The CPU 2 may load part or all of the above program into the SRAM 5 at appropriately timing and execute the loaded program.

The cryptographic processing section 3 includes the key data storage section 6, which holds a plurality of pieces of key data (for example, common key data) to be used by the cryptographic processing section 3. The key data storage section 6 may be provided in a cryptographic circuit of the cryptographic processing section 3, or may be provided outside the cryptographic circuit of the cryptographic processing section 3. In either case, the key data storage section 6 is configured in the state of being concealed from the CPU 2. The cryptographic processing section 3 functions as, for example, a cryptographic processing apparatus for encrypting and/or decrypting input data using a common key cryptosystem. For example, the cryptographic processing section 3 can perform encryption and/or decryption based on the AES (Advanced Encryption Standard) cryptosystem, using key data held in the key data storage section 6 and operates in, for example, the CBC (Cipher Block Chaining) operation mode, the CTR (Counter) operation mode, the ECB (Electronic Codebook) operation mode, the CFB (Cipher Feedback) operation mode, the OFB (Output Feedback) operation mode, and the like. It should be noted that the cryptographic processing section 3 may be a cryptographic processing apparatus for performing encryption and/or decryption based not only on the AES cryptosystem, but also on another cryptographic method.

Figure 2:
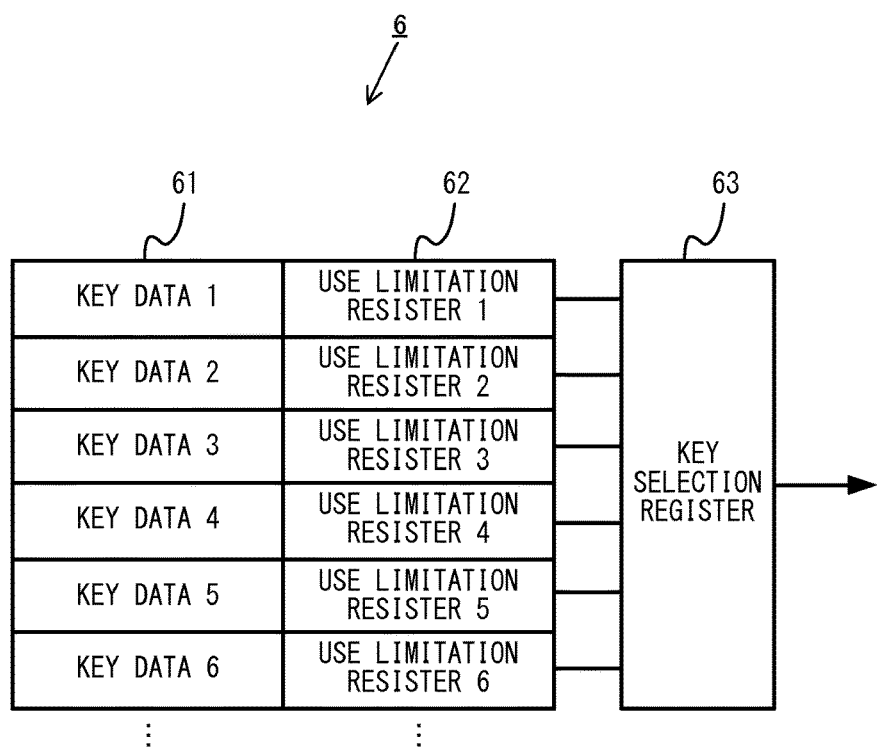
FIG. 2 is a block diagram showing a non-limiting example of a key data storage section 6.

Next, with reference to FIG. 2, an example of the key data storage section 6 is described. It should be noted that FIG. 2 is a block diagram showing the example of the key data storage section 6.

In FIG. 2, the key data storage section 6 includes key data holding sections 61, use limitation registers 62, and a key selection register 63. The key data holding sections 61 hold n pieces of key data (common key data) 1 to n using a method having a high tamper resistance, for example, using a ROM macro that complicates physics analysis. As an example, the key data holding sections 61 may hold pieces of key data 1 to n at the time of manufacture of the integrated circuit 1. Alternatively, if pieces of key data 1 to n are written after the manufacture, the key data holding sections 61 may be composed of eFUSE (electrical fuse) or the like. It should be noted that the above n may be set in accordance with the number of versions of assumed firmware, and may be set to n=32, for example. Further, data held in the key data holding sections 61 may be cryptographic salt data that serves as a salt for generating key data for use in encryption or decryption.

The use limitation registers 62 set each piece of key data held in the key data holding sections 61 to be usable or unusable and hold the setting. As an example, the use limitation registers 62 are composed of the Sticky bit provided for each piece of key data. The Sticky bit is the following register. When a reset is canceled, the register is initialized to 0. Then, 1 can be written to the register in accordance with a command from another apparatus, but cannot be changed back to 0 until the next hardware reset. In this case, each bit of each use limitation register 62 is set to 0, thereby indicating that key data corresponding to the use limitation register 62 is usable. Each bit is set to 1, thereby indicating that the key data corresponding to the use limitation register 62 is unusable. Consequently, the setting of the key data held in each key data holding section 61 can be changed from usable to unusable, and cannot be changed from unusable to usable unless the hardware is reset.

As another example, the use limitation registers 62 are composed of a register for setting each piece of key data to be usable or unusable and holding the setting, and a setting completion register for limiting the writing to the register. For example, if data (for example, data representing a numerical value of 0) meaning setting incompletion is written in the setting completion register, it is possible to write to the register holding the setting of each piece of key data. If, however, data (for example, data representing a numerical value of 1) meaning setting completion is written to the setting completion register, it is not possible to write to all the registers holding the settings of the pieces of key data after that. Then, if data meaning setting completion is written to the setting completion register, the setting completion register cannot cancel the setting completion.

The key selection register 63 holds the type (the key number) of key data selected by the cryptographic processing section 3. Then, if the key data selected by the key selection register 63 is set to be usable by the use limitation register 62, the cryptographic processing section 3 performs the process of reading the key data from the key data storage section 6 and encrypting and/or decrypting input data.

The version information storage section 7 is composed of a non-volatile memory having the number of bits smaller by 1 (that is, n-1 bits) than the number of pieces of key data (common key data) held in the key data storage section 6. Then, the version information storage section 7 manages version information (a version number Y, which corresponds to a key number Y) of the latest firmware started in the information processing apparatus. Specifically, the version information storage section 7 is composed of an OTP (One-Time Programmable) memory and is configured such that each bit such as eFUSE or an antifuse can be written from 0 to 1. For example, if the version information storage section 7 is composed of a non-volatile memory having 4 bits, each bit is rewritten from 0 to 1 in order of 0b0000→0b0001→0b0011→0b0111→0b1111 from one end. This enables the version information storage section 7 to indicate a key number usable by upgrading firmware, and the number of bits rewritten with 1 indicates the key number Y (the version number Y). For example, by the above rewriting, the version information storage section 7 can indicate key number 0→key number 1→key number 2→key number 3→key number 4, and can indicate the key numbers of five pieces of key data, using 4 bits. Further, the version information storage section 7 is configured such that each bit can be written from 0 to 1, whereby the version of version information cannot be changed back to an older version.

Figure 3:
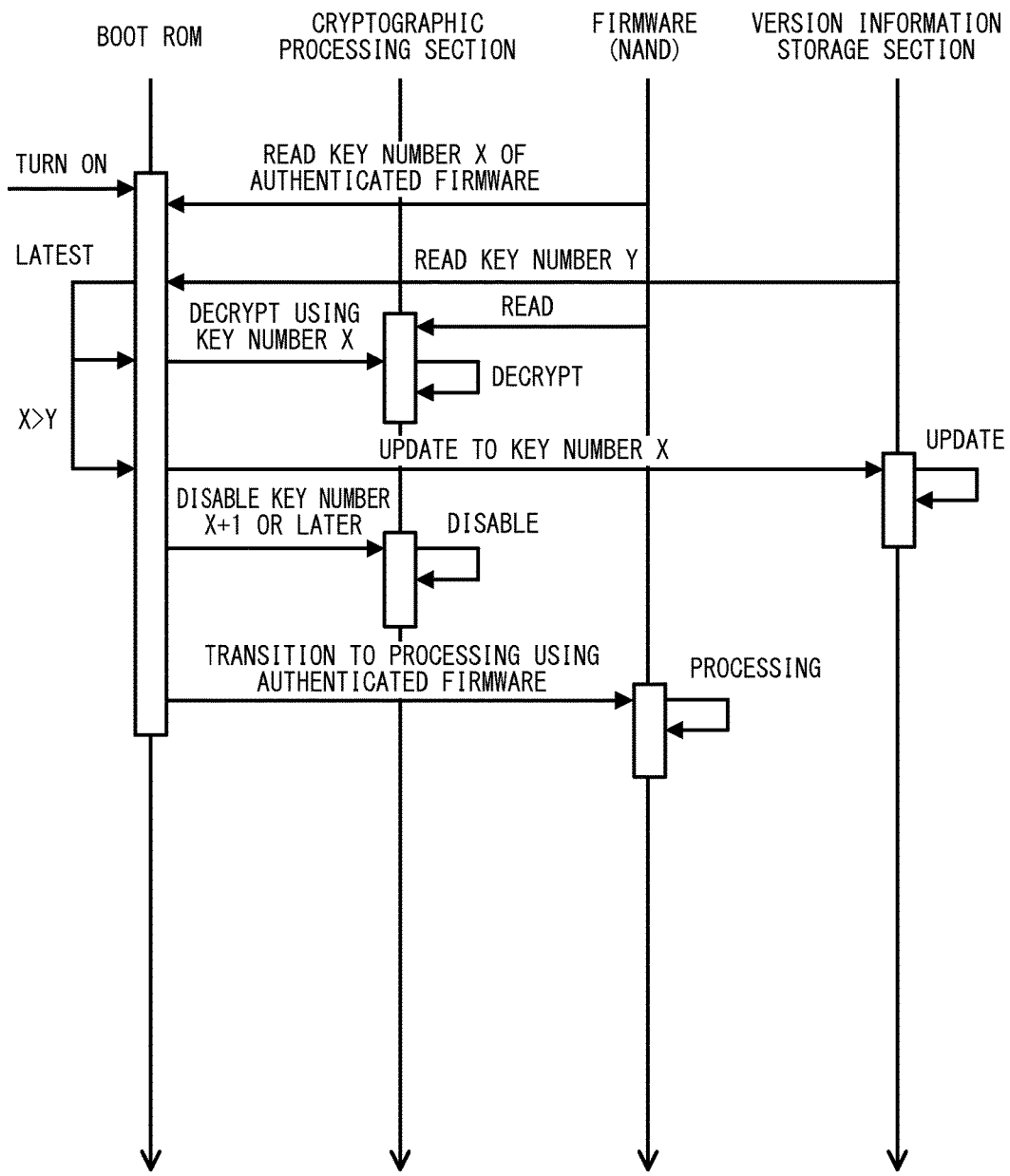
FIG. 3 is a chronological diagram showing a first non-limiting example of an overview of an operation performed by the information processing apparatus according to the first exemplary embodiment.

Next, with reference to FIG. 3, a description is given of a first example of an overview of an operation performed by the information processing apparatus. It should be noted that FIG. 3 is a chronological diagram showing the first example of the overview of the operation performed by the information processing apparatus.

Referring to FIG. 3, if a user performs the operation of manually turning on a power switch, for example, and the information processing apparatus is turned on, the processing of the CPU 2 by a boot program (a boot ROM) stored in the ROM 4 (hereinafter referred to as "the processing by the boot ROM") is started. Here, the boot program is software inaccessible by another piece of software and is software to be automatically executed by the CPU 2 at the start of the information processing apparatus. For example, software to be automatically executed at the start is a program to be executed first after the information processing apparatus is turned on, and then, a reset signal input until a clock signal becomes stable is canceled.

The boot ROM reads the header and the signature of firmware from a specified peripheral (for example, the NAND 9) and authenticates the firmware. Then, if the firmware is authenticated, the boot ROM reads a key number X described in the header of the authenticated firmware. For example, the boot ROM acquires the key number X from the latest version of the authenticated firmware stored in the NAND 9. Here, the firmware is an example of a program to be read from outside the integrated circuit 1 (SoC) first. Further, the firmware may be a program to be executed subsequently to the execution of the boot program. The key number X is a value indicating the type of a cryptographic key for decrypting the firmware and can also correspond as a value indicating the version of the firmware. Further, the key number X corresponds to key data held in advance in the key data storage section 6.

It should be noted that as will be described later, key data held in advance in the key data storage section 6 may be used not only to decrypt the firmware, but also to decrypt or encrypt input data for use in a program (for example, a user application program) or processing to be executed after that. For example, input data for performing a decryption process on the program is input to the cryptographic processing section 3, the cryptographic processing section 3 acquires key data corresponding to the key number X from the key data storage section 6 and outputs data decrypted by performing a decryption process on the input data using the acquired key data.

Next, the boot ROM reads a key number Y from the version information storage section 7. As described above, the version information storage section 7 manages the key number Y based on the number of bits rewritten with 1. Thus, the CPU 2 detects the number of bits rewritten with 1, and thereby can obtain the key number Y.

Next, the boot ROM compares the key number X with the key number Y and determines whether or not the authenticated firmware is the latest version. For example, if X<Y, the boot ROM determines that the authenticated firmware is not the latest version. Then, if the authenticated firmware is not the latest version, the boot ROM prohibits the transition to a decryption process on the firmware and processing using the firmware. If, on the other hand, X≥Y, the boot ROM determines that the authenticated firmware is the latest version. Then, if the authenticated firmware is the latest version, the boot ROM reads the firmware from the NAND 9 and instructs the cryptographic processing section 3 to decrypt the firmware using key data corresponding to the key number X.

In the state immediately after the information processing apparatus is turned on, all the use limitation registers 62 are initialized to 0. Thus, all the pieces of key data held in the key data holding sections 61 are in usable states. In accordance with the decryption instruction from the boot ROM, the cryptographic processing section 3 performs a decryption process on the authenticated firmware using key data corresponding to the key number X held in the key data holding sections 61.

Next, if X>Y as a result of comparing the key number X with the key number Y, that is, if a version newer than the latest firmware started in the information processing apparatus is authenticated before the current moment (for example, the firmware is updated or upgraded), the boot ROM updates the key number X as the key number managed by the version information storage section 7. Consequently, the version information storage section 7 manages the key number X as the latest version information using the OTP memory.

Next, the boot ROM sets key data corresponding to the version of a key number X+1 or later held in the key data storage section 6, to disabled (unusable). Specifically, the boot ROM writes 1 to all use limitation registers 62 corresponding to pieces of key data of the key number X+1 or later, that is, pieces of key data for use in versions newer than that of the key data corresponding to the latest firmware authenticated at the current moment, thereby disabling all the pieces of key data. It should be noted that as described above, the specifications are such that information of the use limitation registers 62 set by the boot ROM cannot be changed unless the hardware is reset.

Then, the boot ROM transitions to processing by the authenticated firmware decrypted by the cryptographic processing section 3. From this point forward, the CPU 2 performs processing by the firmware.

Figure 4:
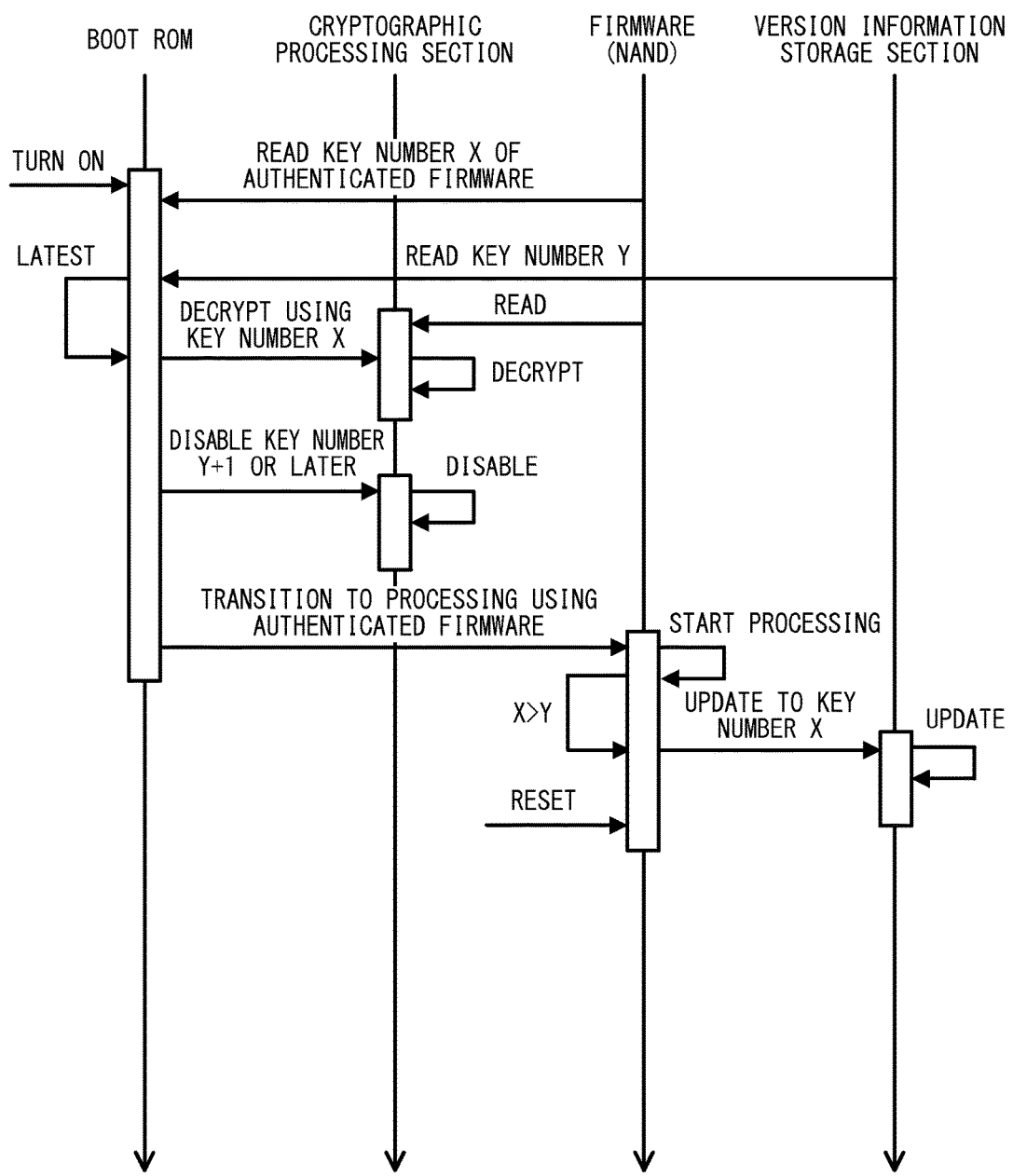
FIG. 4 is a chronological diagram showing a second non-limiting example of the overview of the operation performed by the information processing apparatus according to the first exemplary embodiment.

Next, with reference to FIG. 4, a description is given of a second example of the overview of the operation performed by the information processing apparatus. It should be noted that FIG. 4 is a chronological diagram showing the second example of the overview of the operation performed by the information processing apparatus.

Referring to FIG. 4, if the information processing apparatus is turned on, then similarly to the first example, the boot ROM starts processing. For example, the boot ROM authenticates the latest version of firmware stored in the NAND 9 and reads a key number X described in the header of the authenticated firmware. Then, the boot ROM reads a key number Y from the version information storage section 7.

Next, the boot ROM compares the key number X with the key number Y and determines whether or not the authenticated firmware is the latest version. Then, if the authenticated firmware is not the latest version (if X<Y), the boot ROM prohibits the transition to a decryption process on the firmware and processing using the firmware. If, on the other hand, the authenticated firmware is the latest version (if X≥Y), the boot ROM reads the firmware from the NAND 9 and instructs the cryptographic processing section 3 to decrypt the firmware using key data corresponding to the key number X.

Next, the boot ROM sets key data corresponding to the version of a key number Y+1 or later held in the key data storage section 6 to disabled (unusable). As is clear from comparison with the above first example, in the second example, the boot ROM performs the process of disabling the key data without updating the key number managed by the version information storage section 7. Further, without using key number information described in the header of the firmware, the boot ROM determines the range where the key data is disabled, based on version information managed by the version information storage section 7, that is, version information (the version number Y and the key number Y) of the latest firmware started in the information processing apparatus.

Then, the boot ROM transitions to processing by the authenticated firmware decrypted by the cryptographic processing section 3, and the CPU 2 starts processing by the firmware (hereinafter referred to as "the processing by the firmware").

The firmware compares the key number X described in the header of the firmware, with the key number Y managed by the version information storage section 7. Then, if X>Y, that is, if the firmware of which the version is newer than that of the latest firmware started in the information processing apparatus is started before the current moment, the boot ROM updates the key number X as the key number managed by the version information storage section 7. Here, a case where X>Y is a case where the firmware is updated or upgraded, thereby currently starting the latest version of the firmware for the first time (for example, a case where X=Y+1). However, key data corresponding to the version of the key number Y+1 or later held in the key data storage section 6 is disabled. Thus, key data corresponding to the latest version X (that is, the key number X and the key number Y+1) is set to be unusable. Thus, the CPU 2 once resets the hardware.

If the hardware is reset, the above processing from the turning on of the information processing apparatus is performed again. In this case, the latest version of the firmware corresponding to the key number X is started again. However, the key number managed by the version information storage section 7 is also updated to the key number X. Thus, key data corresponding to the version of a key number X+1 or later held in the key data storage section 6 is disabled. Thus, after the firmware is restarted, the key data corresponding to the latest version X of the firmware (that is, the key number X) is also set to be usable.

As described above, according to the operations of the information processing apparatus in the above first and second examples, key data held in the key data storage section 6 is usable in the range corresponding to identification information (version information) of firmware. Thus, it is possible to ensure the confidentiality of the key data in accordance with the identification information. For example, regarding key data held in the key data storage section 6, key data corresponding to a version newer than the version of firmware to be started is unusable. Thus, it is possible to ensure the confidentiality of key data for use in the version of firmware that has not yet become able to be started. Further, key data that cannot be used until the update or the upgrading of firmware is completed is set to be usable by this update or this upgrading. Thus, it is possible to restore the confidentiality lost before this update or this upgrading. Further, after the update or the upgrading of firmware is completed, the firmware of which the version is newer than this update or this upgrading cannot be started. Thus, it is possible to prevent processing by firmware of which the confidentiality is lost.

It should be noted that in the above exemplary embodiment, the usability of key data is set using the range corresponding to version information of firmware to be started from now or firmware started before the current moment. This range, however, can be set in various forms. As a first example, all pieces of key data corresponding to a version newer than the version information are set to be unusable, and all pieces of key data corresponding to a version corresponding to the version information or a version older than this corresponding version are set to be usable. As a second example, all pieces of key data corresponding to a version newer than the version information and key data corresponding to a predetermined key number (for example, key data held in the key data storage section 6 for development or manufacture) are set to be unusable. Then, pieces of key data corresponding to a version corresponding to the version information and a version older than this corresponding version, except for key data corresponding to the predetermined key number, are set to be usable. As a third example, only key data corresponding to a version corresponding to the version information is set to be usable, and all the other pieces of key data are set to be unusable. As a fourth example, all pieces of key data corresponding to a version newer than the version information are set to be unusable, and all pieces of key data corresponding to a version older than a version corresponding to the version information are set to be unusable. Then, key data corresponding to a version corresponding to the version information is set to be usable. It should be noted that if at least one piece of key data corresponding to a version older than the version corresponding to the version information is set to be unusable, the use limitation register 62 corresponding to the key data to be set to be unusable may be set to be unusable. Alternatively, among pieces of key data held in the key data storage section 6, the key data per se to be set to be unusable may be overwritten with dummy data. In the second case, every time the version information is updated, the corresponding key data may be overwritten with dummy data.

In the above exemplary embodiment, the range where key data is set to be usable and the range where key data is set to be unusable are set using version information of firmware to be started from now or firmware started before the current moment. Alternatively, these ranges may be set using another piece of identification information of the firmware. For example, a valid date and time may be set in advance for each piece of key data, and the ranges may be set using date-and-time information set for the firmware.

In addition, in the above exemplary embodiment, when a reset is canceled, the use limitation registers 62 are initialized to 0, thereby setting all the pieces of key data held in the key data holding sections 61 to be usable in the initialized states. Then, the boot ROM sets key data in the range corresponding to identification information of firmware to be unusable. Alternatively, in the initialized states, all the pieces of key data held in the key data holding sections 61 may be set to be unusable. In this case, when a reset is canceled, all the pieces of key data held in the key data holding section 61 are set to be unusable. Then, the boot ROM sets key data in the range corresponding to identification information of firmware to be usable. For example, if the use limitation registers 62 having the setting completion registers are used, it is possible to perform similar processing also in the second setting form.

It should be noted that the cryptographic processing section 3 may decrypt, as well as firmware (first firmware) read from outside the integrated circuit 1 (SoC) first, a program other than the firmware (for example, another piece of firmware to be decrypted after the firmware and used; referred to as "second firmware"). In this case, the configuration can be such that the second firmware can also be decrypted using key data (reference key data) for decrypting the first firmware. As an example, another piece of key data (first key data) is also held in the first firmware, and first extension key data is generated using the reference key data and the first key data. Then, the second firmware is decrypted by the cryptographic processing section 3, using the first extension key data generated from the reference key data and the first key data. As described above, the configuration is such that another program can also be decrypted using key data generated using the reference key data as a salt, whereby it is possible to obtain the effect of improving the confidentiality of the reference key data, not only for the first firmware but also for the other program. Further, if the configuration is such that all programs can be decrypted using only the reference key data, the mere deciphering of the reference key data enables the decryption of all the programs. However, another type of key data may also be used as described above, whereby it is possible to prevent confidentiality from being lost in a chain-reaction manner. It should be noted that if key data corresponding to a version older than the version of firmware to be started is set to be usable, it may not be possible to start the older version of the firmware, but it is possible to decrypt another program corresponding to the older version (for example, an old version of a game program) and perform processing using the other program. It should be noted that the above key data may be used not only for a program, but also for the decryption of various types of data to be used in the program.

In addition, if the version information storage section 7 is composed of an OTP memory, the reliability of data writing may be low. In such a case, the version information storage section 7 may indicate a key number using a plurality of bits as a set. For example, to indicate a key number using two bits as a set, the version information storage section 7 defines 0 if both two bits are 0, and defines 1 if at least one bit is 1. Then, to set 1 in the set of bits, the CPU 2 writes 1 to each of the two bits included in the set of bits. A set of a plurality of bits is thus defined, whereby even if an error in writing occurs in either bit when 1 is written to the version information storage section 7, the writing of 1 to the other bit can prevent malfunction due to the error in writing.

In addition, it is possible to manufacture the integrated circuit 1 described above in a product form for various purposes. In this case, it is possible that a user using the manufactured integrated circuit 1 writes key data. Thus, the integrated circuit 1 may be shipped in a state where key data is not written to the key data holding sections 61. Also in such a product form, the user writes a plurality of pieces of key data to the key data holding sections 61, whereby it is possible to achieve the above information processing.

In addition, in the above description, an example has been used where the cryptographic processing section 3 decrypts a program (for example, firmware) using key data managed by the key data storage section 6. Alternatively, the program may be encrypted using the key data. Also if the program is encrypted, the key data is managed as described above, and management is performed using identification information (version information) of the program, whereby it is possible to obtain a similar effect.

(Second Exemplary Embodiment)

Figure 5:
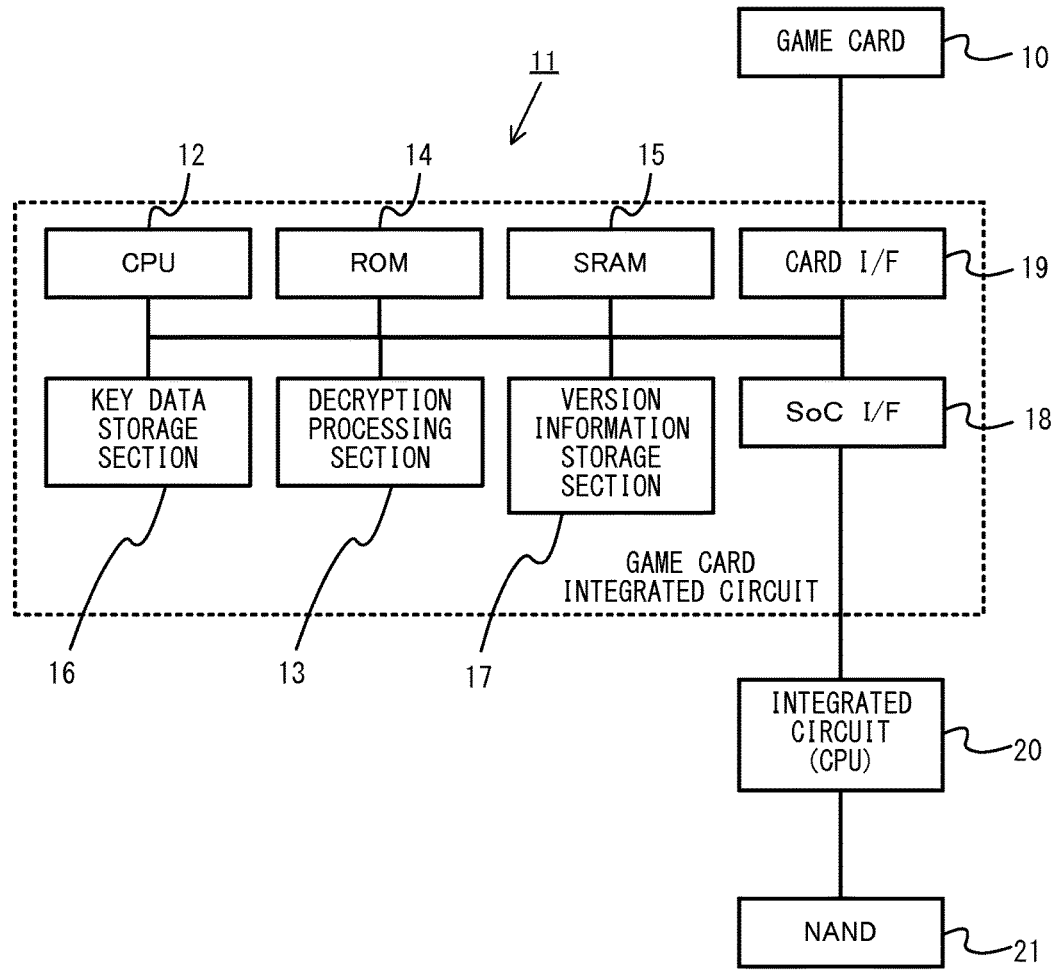
FIG. 5 is a block diagram showing a non-limiting example of an information processing apparatus according to a second exemplary embodiment, which includes a game card integrated circuit 11.

With reference to FIG. 5, a description is given of an information processing apparatus according to a second exemplary embodiment. It should be noted that FIG. 5 is a block diagram showing an example of the information processing apparatus including a game card integrated circuit 11.

For example, the information processing apparatus includes a game card integrated circuit 11. Here, the information processing apparatus can execute a program stored in a storage medium such as an exchangeable memory card or an exchangeable optical disk, or received from a server or another apparatus. It should be noted that the information processing apparatus may include one or more apparatuses, and the game card integrated circuit 11 may be provided in a plurality of apparatuses in a dispersed manner In the information processing apparatus, an integrated circuit 20, which is composed of a SoC or the like, a NAND 21, and the like are provided in addition to the game card integrated circuit 11. Further, a replaceable game card 10 can be attached to the information processing apparatus. Further, the game card integrated circuit 11 includes a CPU 12, a decryption processing section 13, a ROM 14, an SRAM 15, a key data storage section 16, a version information storage section 17, a SoC I/F 18, a card I/F 19, and the like on a single semiconductor chip, using an ASIC (Application-Specific Integrated Circuit), for example. Then, the CPU 12 transmits and receives data, a command, an address, and the like to and from the decryption processing section 13, the ROM 14, the SRAM 15, the version information storage section 17, the NAND 21, and the game card 10. It should be noted that in the exemplary embodiment, the CPU 12 performs transmission and reception to and from the NAND 21 via the SoC I/F 18 and the integrated circuit 20 and performs transmission and reception to and from the game card 10 via the card I/F 19. For example, the game card integrated circuit 11 has the function of decrypting card data stored in the game card 10 and outputting the card data to the integrated circuit 20, and the function of encrypting data corresponding to an instruction from (a CPU of) the integrated circuit 20 and writing the data to the game card 10, and is used for a specific application for managing data transmission and reception between the information processing apparatus and the game card 10. It should be noted that the game card integrated circuit 11 is an example of an application-specific integrated circuit, and may be an ASIC for use in another application.

The CPU 12 is an example of information processing means (a computer) for performing various types of information processing. The CPU 12 has the function of performing, as one of the various types of information processing, the process of initializing the key data storage section 16 and the version information storage section 17 using data (a boot program) set in the ROM 14, for example. Further, the CPU 12 has the function of performing, as one of the various types of information processing, the process of initializing the version information storage section 17 using data (firmware) set in the NAND 21, for example. For example, the CPU 12 executes predetermined programs (a boot program, firmware, and the like), thereby achieving the above functions. Each of the ROM 14, the SRAM 15, and the NAND 21 is a memory accessible by the CPU 12 and stores various types of data for use when the CPU 12 performs the above processes. It should be noted that a program to be executed by the CPU 12 may be stored in any storage device (storage medium) accessible by the CPU 12, and is stored in, for example, the ROM 14 or the NAND 21. The above program may be stored in another storage device provided in the information processing apparatus including the CPU 12, or may be stored in a storage medium detachably attached to the information processing apparatus including the CPU 12. Further, the above program may be stored in a storage device (a server or the like) connected to the CPU 12 via a network. The CPU 12 may load part or all of the above program into the SRAM 15 at appropriately timing and execute the loaded program.

The key data storage section 16 holds a single piece of key data to be used by the decryption processing section 13. The key data storage section 16 may be provided in a cryptographic circuit of the decryption processing section 13, or may be provided outside the cryptographic circuit of the decryption processing section 13. In either case, the key data storage section 16 is configured in the state of being concealed from the CPU 12.

The version information storage section 17 is composed of a non-volatile memory and manages version information (for example, a version number N) of the latest firmware started in the information processing apparatus. As an example, the version information storage section 17 is composed of an OTP memory and is configured such that each bit such as eFUSE or an antifuse can be written from 0 to 1. For example, if the version information storage section 17 is composed of a non-volatile memory having 4 bits, each bit is rewritten from 0 to 1 in order of 0b0000→0b0001→0b0011→0b0111→0b1111 from one end. This enables the version information storage section 17 to indicate a version number usable by upgrading firmware, and the number of bits rewritten with 1 indicates the version number N. For example, by the above rewriting, the version information storage section 17 can indicate version number 0→version number 1→version number 2→version number 3→version number 4, and can indicate the version numbers of five pieces of key data, using 4 bits. Further, the version information storage section 17 is configured such that each bit can be written from 0 to 1, whereby the version of version information cannot be changed back to an older version.

The decryption processing section 13 functions as a decryption processing apparatus for, for example, decrypting encrypted firmware. For example, the decryption processing section 13 generates new decryption key data using a single piece of key data held in the key data storage section 16 and version information (for example, a version number N) of the latest firmware to be decrypted, and decrypts the firmware using the generated decryption key data. For example, the decryption processing section 13 includes an SHA (Secure Hash Algorithm) circuit. The decryption processing section 13 inputs a single piece of key data held in the key data storage section 16 and a version number to the SHA circuit, thereby generating new decryption key data. It should be noted that an AES circuit may be used to generate the decryption key data. It should be noted that the decryption processing section 13 may be a decryption processing apparatus for performing decryption based not only on the SHA method or the AES cryptosystem, but also on another method.

Figure 6:
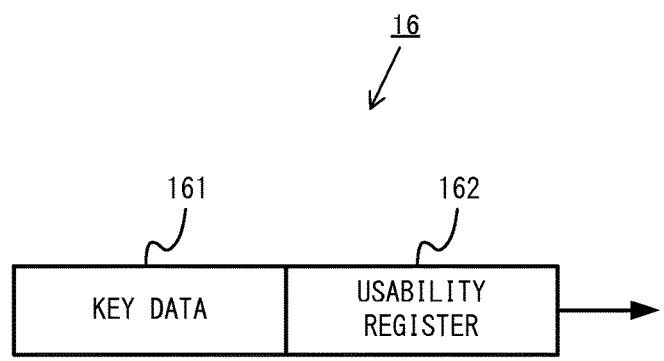
FIG. 6 is a block diagram showing a non-limiting example of a key data storage section 16.

Next, with reference to FIG. 6, an example of the key data storage section 16 is described. It should be noted that FIG. 6 is a block diagram showing the example of the key data storage section 16.

In FIG. 6, the key data storage section 16 includes a key data holding section 161 and a usability register 162. The key data holding section 161 holds a single piece of key data (common key data) using a method having a high tamper resistance, for example, using a ROM macro that complicates physics analysis. As an example, the key data holding section 161 may hold key data at the time of manufacture of the game card integrated circuit 11. Alternatively, if key data is written after the manufacture, the key data holding section 161 may be composed of eFUSE or the like. It should be noted that as will be apparent later, key data held in the key data holding section 161 functions as cryptographic salt data that serves as a salt for generating decryption key data for use in the decryption of firmware.

The usability register 162 sets key data held in the key data holding section 161 to be usable or unusable and holds the setting. As an example, the usability register 162 is composed of the Sticky bit provided for the key data. The Sticky bit in the usability register 162 is the following register. When the information processing apparatus is turned on, or a reset is canceled, the register is initialized to 0. Then, 1 can be written to the register in accordance with a command from another apparatus, but cannot be changed back to 0 until the next turning on, or the next hardware reset. In this case, a bit of the usability register 162 is set to 0, thereby indicating that the key data held in the key data holding section 161 is usable. The bit is set to 1, thereby indicating that the key data is unusable. Consequently, the setting of the key data held in the key data holding section 161 can be changed from usable to unusable, and cannot be changed from unusable to usable unless the information processing apparatus is turned off and turned on, or the hardware is reset.

As another example, the usability register 162 is composed of a register for setting the key data to be usable or unusable and holding the setting in association with the key data, and a setting completion register for imposing a limitation, thereby determining whether or not it is possible to write to the register. For example, if data (for example, data representing a numerical value of 0) meaning setting incompletion is written in the setting completion register, it is possible to write to the register holding the setting of the key data. If, however, data (for example, data representing a numerical value of 1) meaning setting completion is written to the setting completion register, it is not possible to write to all the registers holding the setting of the key data after that. Then, if data meaning setting completion is written to the setting completion register, the setting completion register cannot cancel the setting completion until the next turning on or the next hardware reset.

Figure 7:
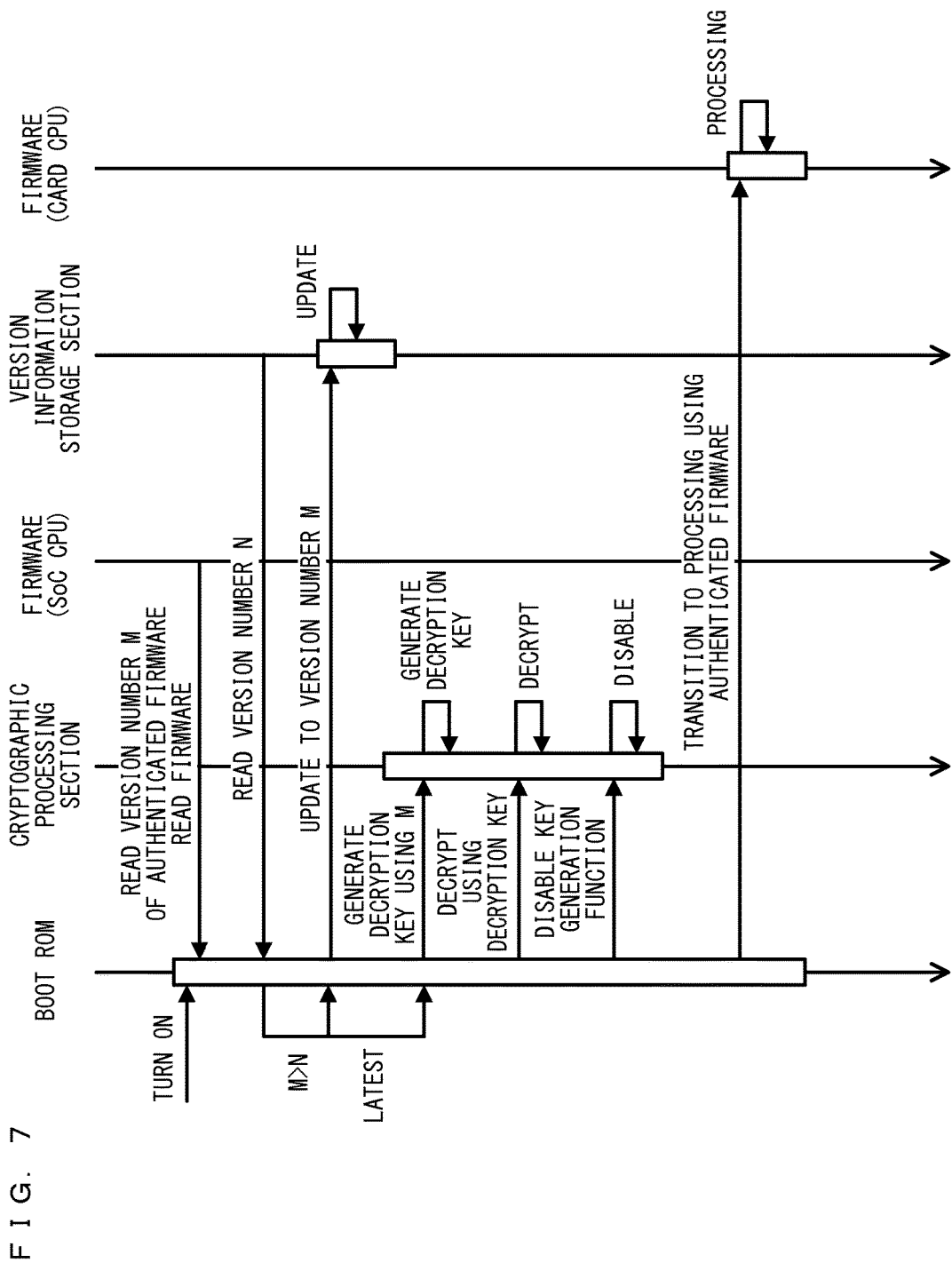
FIG. 7 is a chronological diagram showing a third non-limiting example of an overview of an operation performed by the information processing apparatus according to the second exemplary embodiment.

Next, with reference to FIG. 7, a description is given of a third example of an overview of an operation performed by the information processing apparatus. It should be noted that FIG. 7 is a chronological diagram showing the third example of the overview of the operation performed by the information processing apparatus.

Referring to FIG. 7, if a user performs the operation of manually turning on a power switch, for example, and the information processing apparatus is turned on, the processing of the CPU 12 by a boot program (a boot ROM) stored in the ROM 14 (hereinafter referred to as "the processing by the boot ROM") is started. Here, the boot program is software inaccessible by another piece of software and is software to be automatically executed by the CPU 12 at the start of the information processing apparatus. For example, software to be automatically executed at the start is a program to be executed first after the information processing apparatus is turned on, and then, a reset signal input until a clock signal becomes stable is canceled.

The boot ROM reads the header and the signature of firmware and the firmware from a specified peripheral (for example, the NAND 21) and authenticates the firmware. Then, if the firmware is authenticated, the boot ROM reads a version number M described in the header of the authenticated firmware. For example, the boot ROM acquires, via the integrated circuit 20 and the SoC I/F 18, the version number M from the latest version of the authenticated firmware stored in the NAND 21. Here, the firmware is an example of a program to be read from outside the game card integrated circuit 11 (ASIC) first. Further, the firmware may be a program to be executed subsequently to the execution of the boot program. In this case, the version number M may be a value indicating the version of the program.

Next, the boot ROM reads a version number N from the version information storage section 17. As described above, the version information storage section 17 manages the version number N based on the number of bits rewritten with 1. Thus, the CPU 12 detects the number of bits rewritten with 1, and thereby can obtain the version number N.

Next, the boot ROM compares the version number M with the version number N and determines whether or not the authenticated firmware is the latest version. For example, if M<N, the boot ROM determines that the authenticated firmware is not the latest version. Then, if the authenticated firmware is not the latest version, the boot ROM prohibits the transition to a decryption process on the firmware and processing using the firmware. If, on the other hand, M≥N, the boot ROM determines that the authenticated firmware is the latest version.

Next, if M>N as a result of comparing the version number M with the version number N, that is, if a version newer than the latest firmware started in the information processing apparatus is authenticated before the current moment (for example, the firmware is updated or upgraded), the boot ROM updates the version number M as the version number managed by the version information storage section 17. Then, after the version number is updated, then based on the setting of a register provided in the version information storage section 17 or the like, a setting may be made so that it is not possible to write to the version information storage section 17 in the subsequent processing. Consequently, the version information storage section 17 manages the version number M as the latest version information using the OTP memory.

It should be noted that if M≤N in the process of comparing the version number M with the version number N, then based on the setting of the register provided in the version information storage section 17 or the like, a setting may be made so that it is not possible to write to the version information storage section 17 in the subsequent processing. This can prevent information stored in the version information storage section 17 from being rewritten by another apparatus. As will be apparent later, if M>N in the process of comparing the version number M with the version number N, a setting is made so that it is not possible to write to the version information storage section 17 in the subsequent processing.

Next, if the authenticated firmware is the latest version, the boot ROM instructs the decryption processing section 13 to generate decryption key data using the version number M. In the state immediately after the information processing apparatus is turned on, the usability register 162 is initialized to 0. Thus, the key data held in the key data holding section 161 is in a usable state. In accordance with the decryption key generation instruction from the boot ROM, the decryption processing section 13 inputs the key data held in the key data holding section 161 and the version number M to the SHA circuit, thereby generating decryption key data. Then, the decryption processing section 13 writes the decryption key data to a storage area in the decryption processing section 13 (for example, in the SHA circuit).

Next, the boot ROM instructs the decryption processing section 13 to decrypt the authenticated firmware using the generated decryption key data. Then, in accordance with the decryption instruction from the boot ROM, the decryption processing section 13 performs the process of decrypting the authenticated firmware using the decryption key data written in the decryption processing section 13.

Next, the boot ROM instructs the decryption processing section 13 to disable a key generation function for generating decryption key data. Then, the decryption processing section 13 writes 1 to the usability register 162 in accordance with the key generation function disabling instruction from the boot ROM, thereby disabling the key generation function using the key data. It should be noted that as described above, the specifications are such that information of the usability register 162 set by the boot ROM cannot be changed unless the information processing apparatus is turned on again, or the hardware is reset. Further, the decryption processing section 13 overwrites, with another piece of data, decryption key data written in the storage area in the decryption processing section 13, thereby erasing the decryption key data. It should be noted that the boot ROM may, based on the setting of a register provided in the decryption processing section 13 or the like, make a setting so that it is not possible to access the decryption processing section 13 in the subsequent processing, thereby disabling the key generation function for generating decryption key data. In any disabling process, a circuit (for example, an SHA circuit) for generating a decryption key in the decryption processing section 13 can be used only once unless the circuit is reset in the hardware. This makes it possible to ensure the confidentiality of a decryption key generation process. It should be noted that the key generation function for generating decryption key data may be disabled by another method in which a circuit for generating a decryption key in the decryption processing section 13 can be used only once.

Then, the boot ROM transitions to processing by the authenticated firmware decrypted by the decryption processing section 13. From this point forward, the CPU 12 performs processing by the firmware.

As described above, according to the operation of the information processing apparatus in the above third example, even if a single piece of key data is held in the key data storage section 16, it is possible to improve the confidentiality of a program read from outside, such as firmware, similarly to the above first and second examples. Further, in the information processing apparatus in the above third example, even if firmware is upgraded, it is only necessary to manage a single piece of key data for decrypting the firmware. This can reduce the hardware costs for storing key data. Further, the function of generating a key for decrypting firmware is disabled after the firmware is decrypted and before the firmware is started, and the generated decryption key is also erased. This can also ensure the confidentiality of key data. Further, decryption key data that is not generated until the update or the upgrading of firmware is completed is newly generated by this update or this upgrading. Thus, it is possible to restore the confidentiality lost before this update or this upgrading. Further, after the update or the upgrading of firmware is completed, the firmware of which the version is newer than this update or this upgrading cannot be started. Thus, it is possible to prevent processing by firmware of which the confidentiality is lost.

It should be noted that in the above third example, an example has been used where a single piece of key data is held in the key data storage section 16 to deal with a plurality of versions of firmware. Alternatively, a plurality of pieces of key data may be held in the key data storage section 16. For example, a valid date and time and a purpose can be set in advance for each of a plurality of pieces of key data, and in accordance with the date and time and the purpose at and for which the plurality of pieces of key data are used, the pieces of key data to be used can be switched.

Further, in the above third example, in the period after firmware is decrypted and before the firmware is started, the key generation function for generating decryption key data used to decrypt the firmware is disabled. Alternatively, the key generation function may be disabled at another time. For example, after firmware is started, the key generation function for generating decryption key data used to decrypt the firmware may be disabled. Yet alternatively, in the period after a decryption key for decrypting firmware is generated and before the firmware is decrypted, the key generation function for generating decryption key data used to decrypt the firmware may be disabled. In the second case, if the key generation function is disabled by, based on the setting of the usability register 162, setting the key data held in the key data holding section 161 to be unusable, it is possible to use decryption key data generated even after the key generation function is disabled. Thus, the use of this disabling method makes it possible to disable the key generation function before the firmware is decrypted.

It should be noted that in the above exemplary embodiment, an example has been described where, when the information processing apparatus is turned on, or a reset is canceled, the usability register 162 is initialized to 0, thereby setting the key data held in the key data holding section 161 to be usable in the initialized state. Then, the boot ROM decrypts firmware and then sets the key data to be unusable. Alternatively, in the initialized state, the key data held in the key data holding section 161 may be set to be unusable. In this case, when the information processing apparatus is turned on, or a reset is canceled, the key data held in the key data holding section 161 is set to be unusable. Then, the boot ROM sets the key data held in the key data holding section 161 to be usable. For example, if the usability register 162 having the setting completion register is used, it is possible to perform the process of decrypting firmware and then setting key data to be unusable also in the second setting form.

In addition, if the version information storage section 17 is composed of an OTP memory, the reliability of data writing may be low. In such a case, the version information storage section 17 may indicate a version number using a plurality of bits as a set, similarly to the version information storage section 7.

In addition, it is possible to manufacture the game card integrated circuit 11 described above in a product form for various purposes. In this case, it is possible that a user using the manufactured game card integrated circuit 11 writes key data. Thus, the integrated circuit 1 may be shipped in a state where key data is not written to the key data holding section 161. Also in such a product form, the user writes a plurality of pieces of key data to the key data holding section 161, whereby it is possible to achieve the above information processing.

In addition, in the above description, an example has been used where the decryption processing section 13 decrypts a program (for example, firmware) using key data managed by the key data storage section 16. Alternatively, the program may be encrypted using the key data. Also if the program is encrypted, the key data is managed as described above, and management is performed using identification information (version information) of the program, whereby it is possible to obtain a similar effect.

Further, the above processing using the integrated circuit 1 and the above processing using the game card integrated circuit 11 may be performed at the same time or different times in the same information processing apparatus. For example, the integrated circuit 20 shown in FIG. 5 performs the information processing and the cryptographic process described in the first exemplary embodiment, whereby the game card integrated circuit 11 and the integrated circuit 20 can perform information processing and a cryptographic process using firmware stored in the NAND 21 in parallel.

In addition, in the above description, means for controlling information processing and a cryptographic process is composed of hardware (an integrated circuit) such as a circuit and a register. Alternatively, the means may be composed of so-called software. For example, means for controlling the information processing and the cryptographic process may be composed of means including a control section (CPU) for executing a program for achieving the information processing operation and the cryptographic processing operation. In this case, the program may be supplied to the information processing apparatus not only through an external storage medium such as an external memory, but also through a wired or wireless communication link. Further, the program may be stored in advance in a non-volatile storage device included in the information processing apparatus. It should be noted that examples of an information storage medium having stored therein, the program may include CD-ROMs, DVDs, optical disk storage media similar to these, flexible disks, hard disks, magneto-optical disks, and magnetic tapes, as well as non-volatile memories. Alternatively, an information storage medium having stored therein, the program may be a volatile memory for storing the program. It can be said that such a storage medium is a storage medium readable by a computer or the like. For example, it is possible to provide the various functions described above by causing a computer or the like to load a program from the storage medium and execute it.

In addition, the above description has been given of an operation in the case where a single integrated circuit 1 or a single game card integrated circuit 11 performs information processing and a cryptographic process. Alternatively, at least some of the operations of the information processing and the cryptographic process may be performed by another apparatus. For example, if the information processing apparatus is configured to communicate with another apparatus (for example, another server, another game apparatus, or another mobile terminal), the other apparatus may cooperate to perform each operation of the information processing and the cryptographic process. As described above, at least some of the operations of the information processing and the cryptographic process is performed by another apparatus, whereby it is possible to perform a process similar to the information processing and the cryptographic process described above.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the above operations. Thus, it goes without saying that it is possible to achieve the exemplary embodiment by sharing the operations in any manner.

In addition, the above information processing apparatus may be a mobile game apparatus or a stationary game apparatus, or may be a device such as a general personal computer, a mobile phone, or a PDA (Personal Digital Assistant).

In addition, the exemplary embodiment may be an information processing apparatus having the following configuration.

An information processing apparatus according to the exemplary embodiment operates by starting firmware to be started by a boot program. The information processing apparatus includes a non-volatile memory, firmware acquisition means, version information acquisition means, started version storage control means, comparison means, and start means. The non-volatile memory can be rewritten only once in bits. The firmware acquisition means acquires firmware. The version information acquisition means acquires version information of the acquired firmware. The started version storage control means stores, in the non-volatile memory, information indicating the latest version of started firmware. The comparison means compares the version acquired by the version information acquisition means with the latest version stored in the non-volatile memory. The start means starts the acquired firmware based on a result of the comparison by the comparison means.

Based on the above, it is possible to control the version of firmware to be started.

In addition, only if the result of the comparison by the comparison means indicates that the version of the firmware acquired by the firmware acquisition means is the same as or newer than the latest version stored in the non-volatile memory, the start means may start the firmware.

Based on the above, it is possible to prevent an old version of firmware from being started.

In addition, the started version storage control means may be achieved by a computer for executing a boot program.

In addition, the started version storage control means may be achieved by a computer for executing firmware.

In addition, the non-volatile memory may be configured such that only information indicating a version newer than the stored version can be rewritten.

Further, a boot program according to the exemplary embodiment is executed by a computer of an information processing apparatus before firmware is started. The boot program causes the computer to function as first version information acquisition means, second version information acquisition means, version information comparison means, version information storage control means, and firmware start means. The first version information acquisition means acquires first version information indicating a version set for first firmware to be currently started. The second version information acquisition means acquires, from a non-volatile memory, second version information indicating a version set for the latest second firmware started at or before a previous time. The version information comparison means compares the first version information with the second version information. If the first version information indicates that the first version information is newer than the second version information, the version information storage control means overwrites, with the first version information, the second version information stored in the non-volatile memory and stores the first version information. If the first version information indicates a version of the second version information or later, the firmware start means starts the first firmware.

In addition, the processing orders, the setting values, the conditions used in the determinations, and the like that are used in the encryption/decryption process described above are merely illustrative. Thus, it goes without saying that the exemplary embodiment can be achieved also with other orders, other values, and other conditions.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as a boot program, an information processing apparatus, an information processing system, an information processing program, an information processing method, a semiconductor device, a program, and the like that are capable of improving the confidentiality of a program to be read first, such as firmware.

What is claimed is:

1. A non-transitory computer-readable storage medium having stored therein a boot program to be executed by a computer of an information processing apparatus before firmware is started, the boot program causing the computer to execute:
   initiating execution of a boot program;
   authenticating the firmware after the initiation of execution of the boot program;
   acquiring identification information of the firmware;
   setting usability of a piece of key data in a range corresponding to the identification information, among a plurality of pieces of key data to be used for the firmware, and
   starting the firmware, wherein
   the identification information is a version set for the firmware; the plurality of pieces of key data are different with respect to each version; and
   in the setting of the usability of the piece of key date, among the plurality of pieces of key data, a piece of key data corresponding to a version newer than the acquire version is set to be unusable.

2. The non-transitory computer-readable storage medium having stored therein the boot program according to claim 1, wherein
   in the acquisition of the identification information, identification information of firmware started before a current moment is acquired.

3. The non-transitory computer-readable storage medium having stored therein the boot program according to claim 1, wherein
   in the setting of the usability of the piece of key data, after the firmware is started, the setting of the piece of key data cannot be changed at least from unusable to usable.

4. The non-transitory computer-readable storage medium having stored therein the boot program according to claim 1, wherein
   in the setting of the usability of the piece of key data, among the plurality of pieces of key data, a piece of key data corresponding to the version acquired in the acquisition of the identification information is set to be usable, and at least one of pieces of key data corresponding to a version older than the acquired version is set to be usable.

5. The non-transitory computer-readable storage medium having stored therein the boot program according to claim 1, the boot program further causing the computer to execute
   before the usability of the piece of key data is set in the setting of the usability of the piece of key data, decrypting the firmware corresponding to the acquired identification information, using any of the plurality of pieces of key data.

6. An information processing apparatus comprising:
   a key data storage memory configured to store a plurality of pieces of key data to be used for firmware; and
   a computer processor configured to:
   execute a boot program;
   acquire identification information of the firmware in accordance with the execution of the boot program after initiation of execution of the boot program;
   set usability of a piece of key data in a range corresponding to the identification information, among the plurality of pieces of key data;
   after the usability of the piece of key data is set, start the firmware corresponding to the acquired identification information; and
   after the firmware is started, encrypt or input data using the piece of key data set to be usable.

7. The information processing apparatus according to claim 6, wherein
   the computer processor is further configured to, after the firmware is started, decrypt another program using the piece of key data set to be usable.

8. An information processing system comprising:
   a key data storage memory configured to store a plurality of pieces of key data to be used for firmware; and a computer processor configured to:
  initiate execution of a boot program;
  acquire identification information of the firmware in accordance with execution of the boot program after the initiation of execution of the boot program;
  set usability of a piece of key data in a range corresponding to the identification information, among the plurality of pieces of key data; and
  after the usability of the piece of key data is set, start the firmware corresponding to the acquired identification information, wherein
  the identification information is a version set for the firmware;
  the plurality of pieces of key data are different with respect to each version; and
  in the setting of the usability of the piece of key data, among the plurality of pieces of key data, a piece of key data corresponding to a version newer than the acquired version is set to be unusable.

9. An information processing method to be performed by a computer of an information processing apparatus before firmware is started, the information processing method comprising causing the computer to execute:
  initiating execution of a boot program;
  acquiring identification information of the firmware after the initiation of the boot program; and
  setting usability of a piece of key data in a range corresponding to the identification information, among a plurality of pieces of key data to be used for the firmware, and
  starting the firmware, wherein
  the identification information is version set for the firmware;
  the plurality of pieces of key data are different with respect to each version; and
  in the setting of the usability of the piece of key data, among the plurality of pieces of key data, a piece of key data corresponding to a version newer than the acquired version is set to be unusable.

10. A semiconductor device comprising:
  a processor;
  a first memory configured to store a boot program; and
  a second memory configured to store a plurality of pieces of key data, wherein
  in accordance with execution of the boot program stored in the first memory, the processor is configured to:
  acquire identification information of firmware after initiation of the boot program;
  if a plurality of pieces of key data are stored in the second memory, set usability of a piece of key data in a range corresponding to the identification information, among the pieces of key data; and
  after the usability of the piece of key data is set, start the firmware corresponding to the acquired identification information, wherein
  the identification information is a version set for the firmware;
  the plurality of pieces of key data are different with respect to each version; and
  in the setting of the usability of the piece of y data, among the plurality of pieces of key data, a piece of key data corresponding to a version newer than the acquire version is set to be unusable.

11. An information processing apparatus, including a memory configured to store an internal program, for executing an external program subsequently to execution of the internal program, the information processing apparatus comprising:
  a key data storage memory configured to store a plurality of pieces of key data; and
  a computer processor configured to:
  initiate execution of a boot program;
    acquire the external program from outside the information processing apparatus after the initiation of execution of the boot program;
    acquire identification information of the external program;
    set usability of a piece of key data in a range corresponding to the identification information, among the pieces of key data stored in the key data storage memory; and
    after the usability of the piece of key data is set, start the acquired external program, wherein
  the identification information is a version set for the firmware;
  the plurality of pieces of key data are different with respect to each version; and
  in the setting of the usability of the pies y data, among the plurality of pieces of key data, a piece of key data corresponding to a version newer than the acquired version is set to be unusable.

12. A non-transitory computer-readable storage medium having stored therein a program that cannot be updated and is executed by a computer of an information processing apparatus before a program that can be updated is started, the program causing the computer to execute:
  initiating execution of a boot program;
  acquiring version information of the program that can be updated after the initiation of execution of the boot program;
  based on the acquired version information, setting usability of a piece of key data in a range corresponding to the version information, among a plurality of pieces of key data to be used for the program that can be updated, and
  starting the program that can be updated, wherein
  the identification information is a version set for the firmware;
  the plurality of pieces of key data are different with respect to each version; and
  in the setting of the usability of the piece of key data, among the plurality of pieces of key data, a piece of key data corresponding to a version newer than the acquired version is set to be unusable.

13. A non-transitory computer-readable storage medium having stored therein a boot program to be executed by a computer of an information processing apparatus before firmware is started, the boot program causing the computer to execute:
  initiating execution of the boot program;
  acquiring identification information of the firmware after the initiation of execution of the boot program;
  based on key data stored in advance in a memory and the identification information, generating new key data;
  based on the generated key data, decrypting the firmware corresponding to the identification information;
  disabling generation of key data in the generation of the key data; and
  starting the decrypted firmware, wherein
  in the disabling of generation of key data, a key generation function in the generation of the key data is set to be usable only once, thereby disabling generation of key data in the generation of the key data.

14. The non-transitory computer-readable storage medium having stored therein the boot program according to claim 13, wherein
in the starting of the firmware, the decrypted firmware is started after generation of key data is disabled in the disabling of generation of key data.

15. The non-transitory computer-readable storage medium having stored therein the boot program according to claim 13, wherein
in the disabling of generation of key data, after the firmware is decrypted, the key data stored in the memory is set to be unusable, thereby disabling generation of new key data using the key data.

16. The non-transitory computer-readable storage medium having stored therein the boot program according to claim 13, wherein
in the disabling of generation of key data, after the firmware is decrypted, access to a unit configured to achieve the generation of the key data is set to be impossible, thereby disabling generation of key data in the generation of the key data.

17. The non-transitory computer-readable storage medium having stored therein the boot program according to claim 13, wherein
the memory stores a single piece of key data for generating the key data, and
in the generation of the key data, based on the single piece of key data stored in the memory and the identification information, new key data is generated.

18. The non-transitory computer-readable storage medium having stored therein the boot program according to claim 13, the boot program further causing the computer to execute
disabling the new key data generated in the generation of the key data.

19. The non-transitory computer-readable storage medium having stored therein the boot program according to claim 13, wherein
in the acquisition of the identification information, identification information of firmware started before a current moment is acquired.

20. The non-transitory computer-readable storage medium having stored therein the boot program according to claim 13, wherein
the identification information is a version set for the firmware.

21. An information processing apparatus comprising:
a key data storage memory configured to store key data to be used for firmware; and
a computer processor configured to:
execute a boot program;
acquire identification information of the firmware in accordance with the execution of the boot program after initiation of the execution of the boot program;
based on the key data stored in the key data storage memory and the identification information, generate new key data;
based on the generated key data, decrypt the firmware corresponding to the identification information;
disable generation of key data in the generation of the key data; and
start the decrypted firmware, wherein
in the disabling of generation of key data, a key generation function in the generation of the key data is set to be usable only once, thereby disabling generation of key data in the generation of the key data.

22. An information processing system comprising:
a key data storage memory configured to store key data to be used for firmware; and
a computer processor configured to:
execute a boot program;
acquire identification information of the firmware in accordance with the execution of the boot program after initiation of the execution of the boot program;
based on the key data stored in the key data storage memory and the identification information, generate new key data;
based on the generated key data, decrypt the firmware corresponding to the identification information; and
disable generation of key data in the generation of the key data; and
start the decrypted firmware, wherein
in the disabling of generation of key data, a key generation function in the generation of the key data is set to be usable only once, thereby disabling generation of key data in the generation of the key data.

23. An information processing method to be performed by a computer of an information processing apparatus before firmware is started, the information processing method comprising causing the computer to execute:
initiating execution of a boot program;
acquiring identification information of the firmware after the initiation of execution of the boot program;
based on key data stored in advance in a memory and the identification information, generating new key data;
based on the generated key data, decrypting the firmware corresponding to the identification information;
disabling generation of key data in the generation of the key data; and
starting the decrypted firmware, wherein
in the disabling of generation of key data, a key generation function in the generation of the key data is set to be usable only once, thereby disabling generation of key data in the generation of the key data.

24. A semiconductor device comprising:
a processor;
a first memory configured to store a boot program; and
a second memory configured to store key data, wherein
in accordance with execution of the boot program stored in the first memory, the processor is configured to:
acquire identification information of firmware after initiation of execution of the boot program;
based on the key data stored in the second memory and the identification information, generate new key data;
based on the generated key data, decrypt the firmware corresponding to the identification information;
disable generation of key data in the generation of the key data; and
start the decrypted firmware, wherein
in the disabling of generation of key data, a key generation function in the generation of the key data is set only once, thereby disabling generation of key data in the generation of the key data.

25. An information processing apparatus, including a memory configured to store an internal boot program, for executing an external program subsequently to execution of the internal program, the information processing apparatus comprising:
a key data storage memory configured to store key data to be used for the external program; and a computer processor configured to:
   execute the internal boot program;
   acquire the external program from outside the information processing apparatus;
   acquire identification information of the external program in accordance with the execution of the internal program after initiation of execution of the internal program;
   based on the key data stored in the key data storage memory and the identification information, generate new key data;
   based on the generated key data, decrypt the external program corresponding to the identification information;
   disable generation of key data in the generation of the key data; and
   start the decrypted external program, wherein
in the disabling of generation of key data, a key generation function in the generation of the key data is set to be usable only once, thereby disabling generation of key data in the generation of the key data.

26. A non-transitory computer-readable storage medium having stored therein a program that cannot be updated and is executed by a computer of an information processing apparatus before a program that can be updated is started, the program that cannot be updated causing the computer to execute:
   initiating execution of a boot program;
   acquiring version information of the program that can be updated after the initiation of execution of the boot program;
   based on key data stored in advance in a memory and the acquired version information, generating new key data;
   based on the generated key data, decrypting the program that can be updated corresponding to the version information;
   disabling generation of key data in the generation of the key data; and
   starting the decrypted program that can be updated, wherein
in the disabling of generation of key data, a key generation function in the generation of the key data is set to be usable only once, thereby disable generation of key data in the generation of the key data.

27. A non-transitory computer-readable storage medium having stored therein a boot program to be executed by a computer of an information processing apparatus before firmware is started, the boot program causing the computer to execute:
   initiating execution of a boot program;
   authenticating the firmware after the initiation of execution of the boot program;
   acquiring identification information of the firmware;
   setting usability of a piece of key data in a range corresponding to the identification information, among a plurality of pieces of key data to be used for the firmware;
   starting the firmware; and
   reading the firmware, wherein
in the acquisition of the identification information, the identification information of the read firmware is acquired,
in the acquisition of the identification information, identification information described in a header of the firmware read in the reading of the firmware is acquired as the acquired identification information of the firmware, and
in the setting of the usability of the piece of key data, the usability of the piece of key data is set in accordance with the identification information described in the header.

28. An information processing apparatus comprising:
a key data storage memory configured to store a plurality of pieces of key data to be used for firmware; and
a computer processor configured to:
   execute a boot program;
   acquire identification information of the firmware in accordance with the execution of the boot program after initiation of execution of the boot program;
   set usability of a piece of key data in a range corresponding to the identification information, among the plurality of pieces of key data; and
   after the usability of the piece of key data is set, start the firmware corresponding to the acquired identification information, wherein
   store the identification information of the started firmware in a non-volatile memory,
the identification information stored in the non-volatile memory is acquired as the identification information of the firmware,
the usability of the piece of key data is set in accordance with the identification information stored in the non-volatile memory, and
if the identification information stored in the non-volatile memory is updated, the usability of the piece of key data is reset after the update.

29. A non-transitory computer-readable storage medium having stored therein a boot program to be executed by a computer of an information processing apparatus before firmware is started, the boot program causing the computer to execute:
   initiating execution of the boot program;
   acquiring identification information of the firmware after the initiation of execution of the boot program;
   based on key data stored in advance in a memory and the identification information, generating new key data;
   based on the generated key data, decrypting the firmware corresponding to the identification information;
   disabling generation of key data in the generation of the key data; and
   starting the decrypted firmware;
   reading the firmware; wherein
in the acquisition of the identification information, the identification information of the read firmware is acquired,
in the acquisition of the identification information, identification information described in a header of the firmware read in the reading of the firmware is acquired as the acquired identification information of the firmware, and
in the generation of the key data, based on the key data stored in advance in the memory and the identification information described in the header, new key data is generated.

\* \* \* \* \*